United States Patent
Sugino et al.

(10) Patent No.: US 7,748,854 B2
(45) Date of Patent: Jul. 6, 2010

(54) IMAGE DISPLAY DEVICE

(75) Inventors: Shingo Sugino, Osaka (JP); Tetsuro Shiota, Osaka (JP); Satoshi Hamada, Osaka (JP); Shigeaki Yamano, Osaka (JP)

(73) Assignee: Panasonic Corporation, Osaka (JP)

( * ) Notice: Subject to any disclaimer, the term of this patent is extended or adjusted under 35 U.S.C. 154(b) by 249 days.

(21) Appl. No.: 11/571,392

(22) PCT Filed: Jun. 5, 2006

(86) PCT No.: PCT/JP2006/311186

§ 371 (c)(1),
(2), (4) Date: Dec. 28, 2006

(87) PCT Pub. No.: WO2006/132167

PCT Pub. Date: Dec. 14, 2006

(65) Prior Publication Data

US 2009/0244496 A1 Oct. 1, 2009

(30) Foreign Application Priority Data

Jun. 8, 2005 (JP) ............................. 2005-167954

(51) Int. Cl.
G03B 21/14 (2006.01)
(52) U.S. Cl. ......................................... 353/97; 362/282
(58) Field of Classification Search ................... 353/97, 353/85, 88; 359/594, 232, 332; 362/282, 362/251

See application file for complete search history.

(56) References Cited

U.S. PATENT DOCUMENTS

| 2,952,199 | A * | 9/1960 | Burger et al. ............... 396/214 |
| 7,093,941 | B2 * | 8/2006 | Kawashima et al. .......... 353/97 |
| 7,207,679 | B2 * | 4/2007 | Totani et al. .................. 353/97 |
| 2004/0201829 | A1 * | 10/2004 | Eckhardt ..................... 353/97 |
| 2005/0001997 | A1 * | 1/2005 | Kawaai et al. ................ 353/97 |
| 2007/0297175 | A1 * | 12/2007 | Glent-Madsen ............. 362/282 |

FOREIGN PATENT DOCUMENTS

| JP | 05-188345 | 7/1993 |
| JP | 2001-100699 | 4/2001 |
| JP | 2002-357810 | 12/2002 |
| JP | 2004-361856 | 12/2004 |
| JP | 2005-003744 | 1/2005 |

OTHER PUBLICATIONS

International Search Report for corresponding PCT International Application No. PCT/JP06/311186 dated Jun. 27, 2006.
English translation of Form PCT/ISA/210.

* cited by examiner

*Primary Examiner*—Georgia Y Epps
*Assistant Examiner*—Jerry Brooks
(74) *Attorney, Agent, or Firm*—RatnerPrestia

(57) ABSTRACT

A light-quantity adjusting function of a diaphragm used for light quantity control for improving the contrast of a projected image is controlled to cancel light quantity variation due to variation of the driving power of the light source for increasing the service life. This control keeps the quantity of light coming into a display element at a constant value and achieves both service life extension of the light source and image projection having no brightness fluctuation.

15 Claims, 23 Drawing Sheets

IMAGE DISPLAY DEVICE

THIS APPLICATION IS A U.S. NATIONAL PHASE APPLICATION OF PCT INTERNATIONAL APPLICATION PCT/JP2006/311186 FILED JUNE 5, 2006.

TECHNICAL FIELD

The present invention relates to increase in service life and improvement in image quality of a used light source, in an image display device for spatially modulating a display element having a transmission or reflection type optical modulating function of light from the light source.

BACKGROUND ART

Recently, not only apparatus performance such as image quality or low noise of an image display device but also service lives of the apparatus and a component have received attention from the viewpoint of effectively utilizing the environment and resources. Regarding a projection type image display device typified by a projector, a light source such as a discharge lamp, and an optical component such as a liquid crystal panel and a deflecting plate are consumables, and how to increase the service hours has become one of the demands.

The increase in service life of the light source such as a discharge lamp is disclosed in Japanese Patent Unexamined Publication No. 2005-209572, for example. This document describes a discharge lighting device that is formed of a power control unit for controlling power of the light source and a lighting-time managing unit for measuring continuous driving time of the light source. This device can reduce effective value of the power by varying variation range and variation cycle of the power supplied to the light source in a variation waveform. Therefore, electrode abrasion causing discharge in normal use can be suppressed, and degradation of a glass unit, which is a component of the light source, due to continuous use at a high temperature can be also reduced. As a result, the service life of the light source can be increased.

In one of the methods of improving contrast in the image display device, a restrictor for controlling quantity of light is used. This method improves contrast feeling by further brightening bright video by opening the diaphragm and by further darkening dark video by closing the diaphragm. This technology is disclosed in Japanese Patent Unexamined Publication No. 2001-100699.

However, the conventional configuration has the following problem. When a driving method of achieving the service life extension of the light source is employed, the driving power is varied over time, the brightness of the light source fluctuates in response to the driving power, and hence the brightness on the projection screen fluctuates. As a result, even when the brightness of the video is uniform, the brightness on the projection screen is not stable.

A method such as light quantity control of controlling the diaphragm in interlock with a video signal or diaphragm control of a lens can improve the contrast feeling, but disadvantageously cannot eliminate influence of the brightness fluctuation from the light source.

SUMMARY OF THE INVENTION

The present invention addresses the conventional problems, and provides an image display device for achieving both the service life extension of a light source and optical component and the display of an image having no unnatural fluctuation in brightness of the light source.

The image display device of the present invention has the following elements:
 a light source;
 a light source driving unit for controlling the driving power of the light source;
 a light source driving-level calculating unit for calculating a driving level of the light source and outputting the driving level of the light source to the light source driving unit;
 a diaphragm for adjusting the quantity of light of the light source;
 a diaphragm control unit for controlling the narrowing amount of the diaphragm;
 a diaphragm control-level calculating unit for outputting the narrowing amount to the diaphragm control unit based on a signal from the light source driving-level calculating unit;
 a liquid crystal panel for modulating the light of the light source;
 a liquid crystal driving unit for driving the liquid crystal panel;
 a liquid crystal video signal processing unit for converting an input video signal into a signal for driving the liquid crystal panel; and
 a projection lens for expanding and projecting an image of the liquid crystal panel.

The light source driving-level calculating unit generates fluctuation in driving power that varies repeatedly in a certain period. The diaphragm control-level calculating unit controls the diaphragm so as to cancel the fluctuation in brightness of the light source corresponding to the fluctuation in driving power.

In this configuration, the driving power of the light source is varied for increasing the service life of the light source, but the narrowing amount of the diaphragm disposed on an optical path is controlled so as to cancel the brightness fluctuation of the light source caused by the variation. This diaphragm control allows correction of the brightness fluctuation of the projected image, and allows both service life extension of the light source and image projection having no fluctuation in brightness of the light source.

The diaphragm control-level calculating unit disposed at the image display device of the present invention may control the diaphragm based on the video signal.

In such configuration, the diaphragm control responsive to a signal from the light source driving-level calculating unit is applied to bright video at a further opened position of the diaphragm, and to dark video at a further closed position of the diaphragm. The driving power of the light source is varied for increasing the service life of the light source. However, the brightness fluctuation of the light source caused by the variation is cancelled, the bright video can be projected more brightly, and the dark video can be projected more darkly.

Thus, the image display device of the present invention can increase the service life of the light source, allows control for stable light source brightness having no fluctuation, and can improve the contrast feeling.

Figure 1:
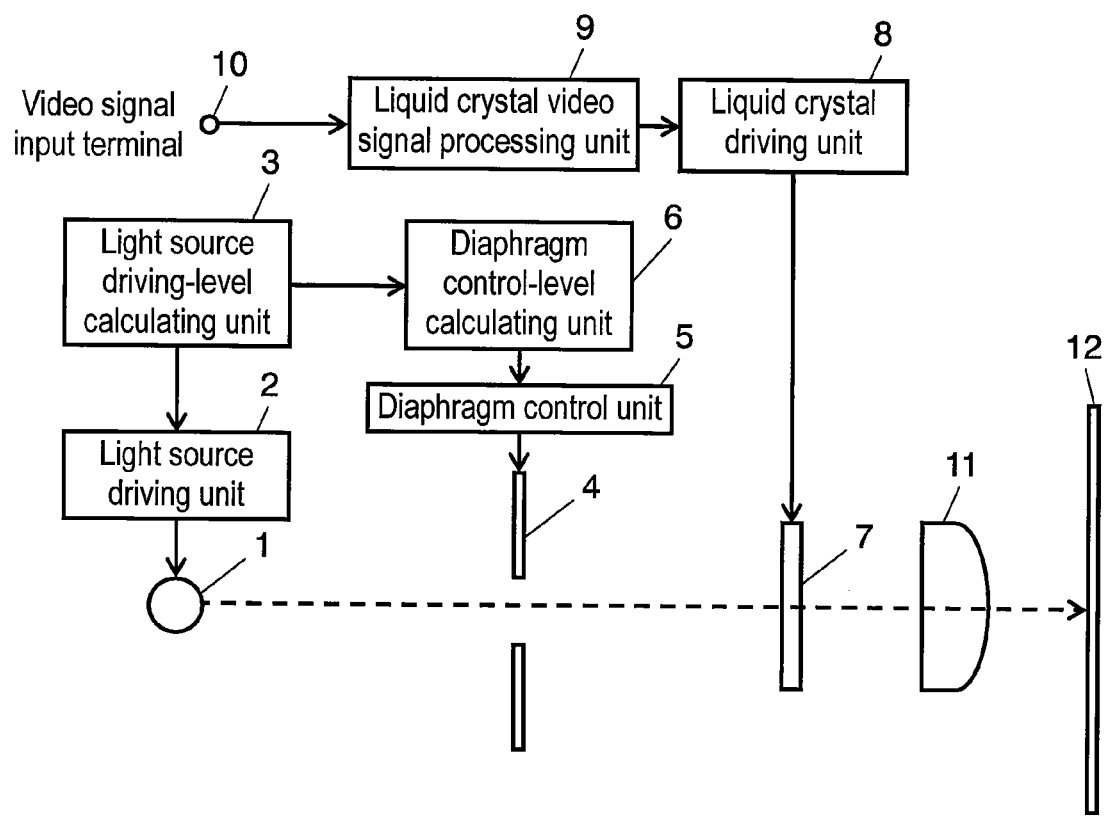
FIG. 1 is a block diagram of a configuration of an image display device in accordance with exemplary embodiment 1 of the present invention.

REFERENCE MARKS IN THE DRAWINGS 1 light source
2 light source driving unit
3 light source driving-level calculating unit
4 diaphragm
5 diaphragm control unit
6 diaphragm control-level calculating unit
7 liquid crystal panel
8 liquid crystal driving unit
9 liquid crystal video signal processing unit
10 video signal input terminal
11 projection lens
12 screen
13 auxiliary diaphragm
14 auxiliary diaphragm control unit
15 auxiliary diaphragm control-level calculating unit

DETAILED DESCRIPTION OF PREFERRED EMBODIMENTS

Exemplary Embodiment 1

Figure 23A:
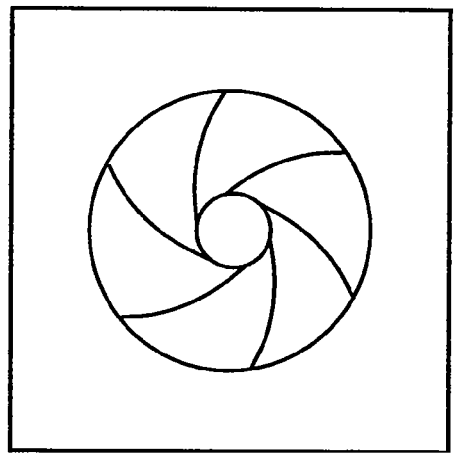
FIG. 23A is a diagram of a general diaphragm structure.
Figure 23B:
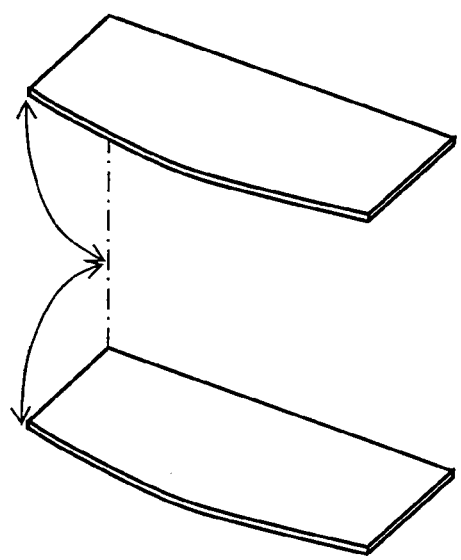
FIG. 23B is a diagram of a blade-shaped diaphragm structure.

FIG. 1 is a block diagram of a configuration of an image display device in accordance with exemplary embodiment 1 of the present invention. In FIG. 1, light source 1 of the image display device includes a light emitting diode (LED), a laser or a discharge lamp such as a high-pressure mercury lamp, metal halide lamp, or xenon lamp. Light source driving unit 2 controls the driving power for driving light source 1. Light source driving-level calculating unit 3 calculates a driving level of light source 1 and outputs it to light source driving unit 2. Diaphragm 4 adjusts the quantity of light in the image display device of the present invention. Diaphragm 4 has a general diaphragm structure of FIG. 23A, or a blade-shaped diaphragm structure of FIG. 23B. Diaphragm control unit 5 controls the narrowing amount of diaphragm 4. Diaphragm control-level calculating unit 6 outputs the narrowing amount to diaphragm control unit 5. Liquid crystal panel 7 has an optical modulating function. Liquid crystal driving unit 8 drives liquid crystal panel 7. Liquid crystal video signal processing unit 9 converts an input video signal into a signal for driving liquid crystal panel 7. Video signal input terminal 10 inputs the video signal to the image display device of the present invention. The video from the image display device is projected to screen 12 via projection lens 11.

Figure 2:
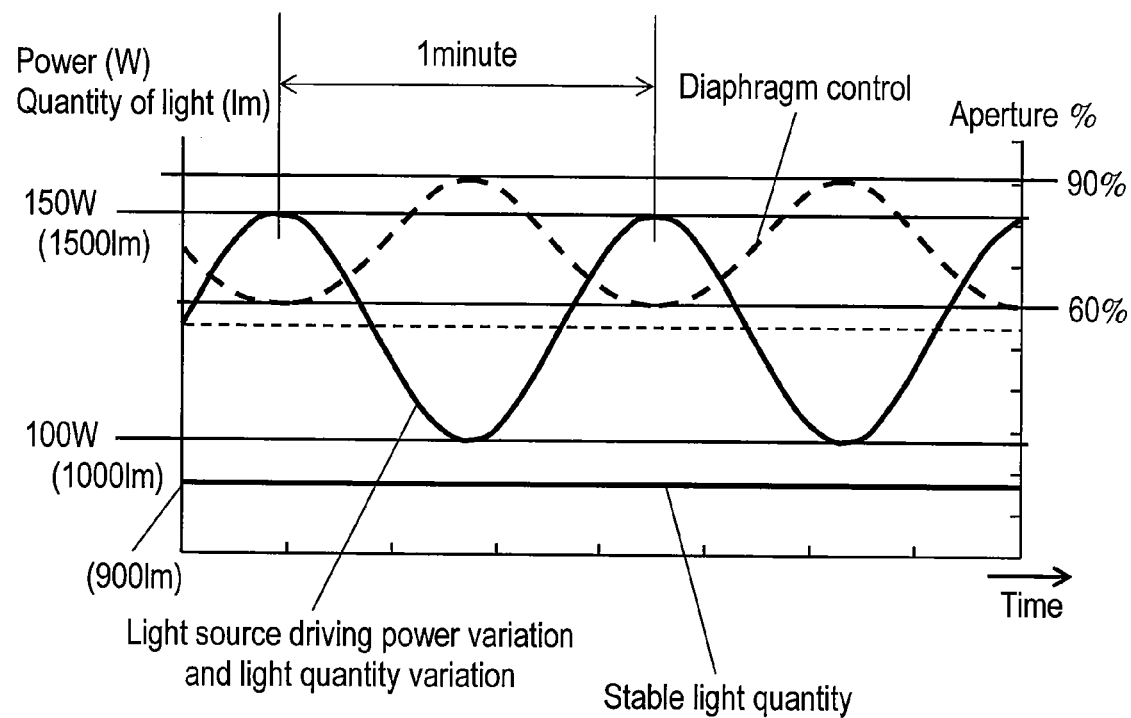
FIG. 2 illustrates an example of the light source drive and diaphragm control characteristic of the image display device in accordance with exemplary embodiment 1.

FIG. 2 illustrates an example of light source drive characteristic and diaphragm control characteristic of the image display device in accordance with exemplary embodiment 1 of the present invention. In FIG. 2, the horizontal axis shows time, the first vertical axis (left) shows power, and the second vertical axis (right) shows aperture. The numerical value in parentheses of the first axis shows the quantity of light coming into liquid crystal panel 7 with respect to each light source driving power. The solid line shows the light source driving level and the time variation of corresponding quantity of light, and the broken line shows the time variation of the aperture of the diaphragm.

Operations of the image display device having the above-mentioned configuration and a driving method will be described with reference to FIG. 1 and FIG. 2.

In FIG. 2, for increasing the service life of light source 1, light source driving unit 2 varies the driving power of light source 1 in a sine wave shape with a divided cycle time of 100

W through 150 W in response to a control signal from light source driving-level calculating unit 3. The average light flux coming into the liquid crystal panel varies from 1000 lm to 1500 lm, and the light quantity difference by the driving power difference is sensed as a fluctuation on the projected image. For eliminating the fluctuation, diaphragm 4 is controlled to be further closed when the driving power of light source 1 is high or to be further opened when the driving power of light source 1 is low. In other words, diaphragm control-level calculating unit 6 calculates the narrowing amount in response to the control signal from light source driving-level calculating unit 3, and diaphragm control unit 5 controls diaphragm 4 as discussed above.

The narrowing amount (aperture) is varied in response to the variation in driving power of the light source. For example, the aperture is set at 60% by diaphragm 4 when the light source is driven at 150 W, or set at 90% when the light source is driven at 100 W. This narrowing amount is defined so that the fully opened state with respect to the movable region of diaphragm 4 corresponds to aperture of 100% and the totally closed state corresponds to aperture of 0%. When diaphragm 4 has a circular shape like the general diaphragm structure, diaphragm 4 is moved in the range from the periphery to the center. When diaphragm 4 has a blade shape, diaphragm 4 is moved in a range from a vertical part or lateral part of the optical path to the center thereof.

This control results in the following state:

quantity of light×aperture=constant, 1500 lm×60%=900 lm, and 1000 lm×90%=900 µm.

Stable quantity of light can be obtained as shown by the solid line of FIG. 2.

In embodiment 1, by employing the driving method of interlocking the power drive of the light source with the diaphragm control, the service life of the light source can be increased and a projected image having no fluctuation can be obtained.

When diaphragm 4 is disposed on the optical path and between the light source and liquid crystal panel 7, time-integrated total quantity of light coming into liquid crystal panel 7 reduces. Therefore, advantageously, the degradation of the components is suppressed, and the service life is increased. The above-mentioned numerical values of the expression are just one example, and they may be set in response to the performance of components of the light source, optical system, and display element or the required brightness.

The driving power of light source 1 is represented by a sine wave of one divided cycle time in FIG. 2; however, it may be represented by a square wave or a step-like wave. A transmission type liquid crystal panel has been described as an optical modulating element for modulating incident light; however, a DMD (digital micro-mirror device) or a reflection type liquid crystal panel may be employed.

In a liquid crystal projector, a transmission type liquid crystal panel RGB (red-green-blue) 3 method is generally described. However, diaphragm 4 is disposed on the optical path and between the light source and a color separation optical system that separates light into three colors of RGB. The light separated into each color is radiated to each corresponding panel, and comes into the projection lens through a photosynthetic optical system. A liquid crystal projector having one liquid crystal panel, a reflection type liquid crystal projector, and a projector employing DLP (digital lighting processing) can be handled similarly to the liquid crystal projector when they have a color separation optical system. That is because a diaphragm is disposed in a similar position, the light travels through the optical modulating element, and then comes into the projection lens through the photosynthetic optical system.

Figure 3:
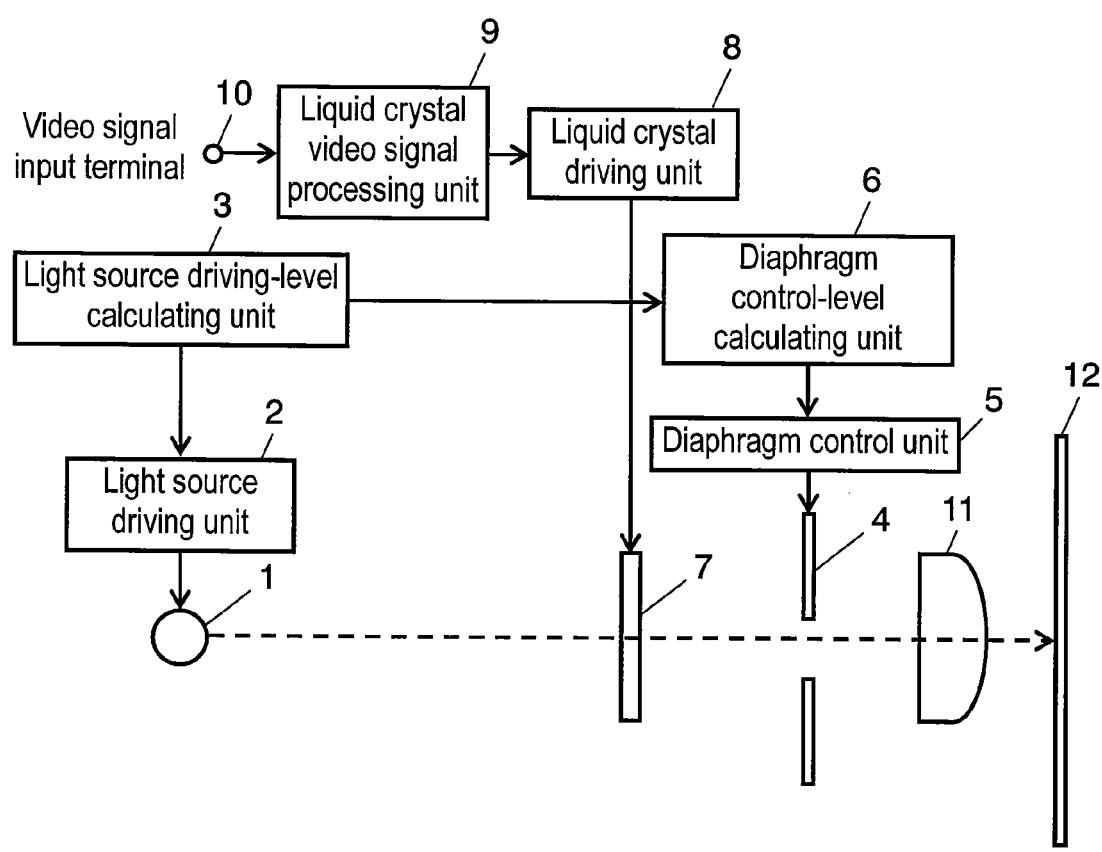
FIG. 3 is a block diagram of another configuration of the image display device in accordance with exemplary embodiment 1.
Figure 4:
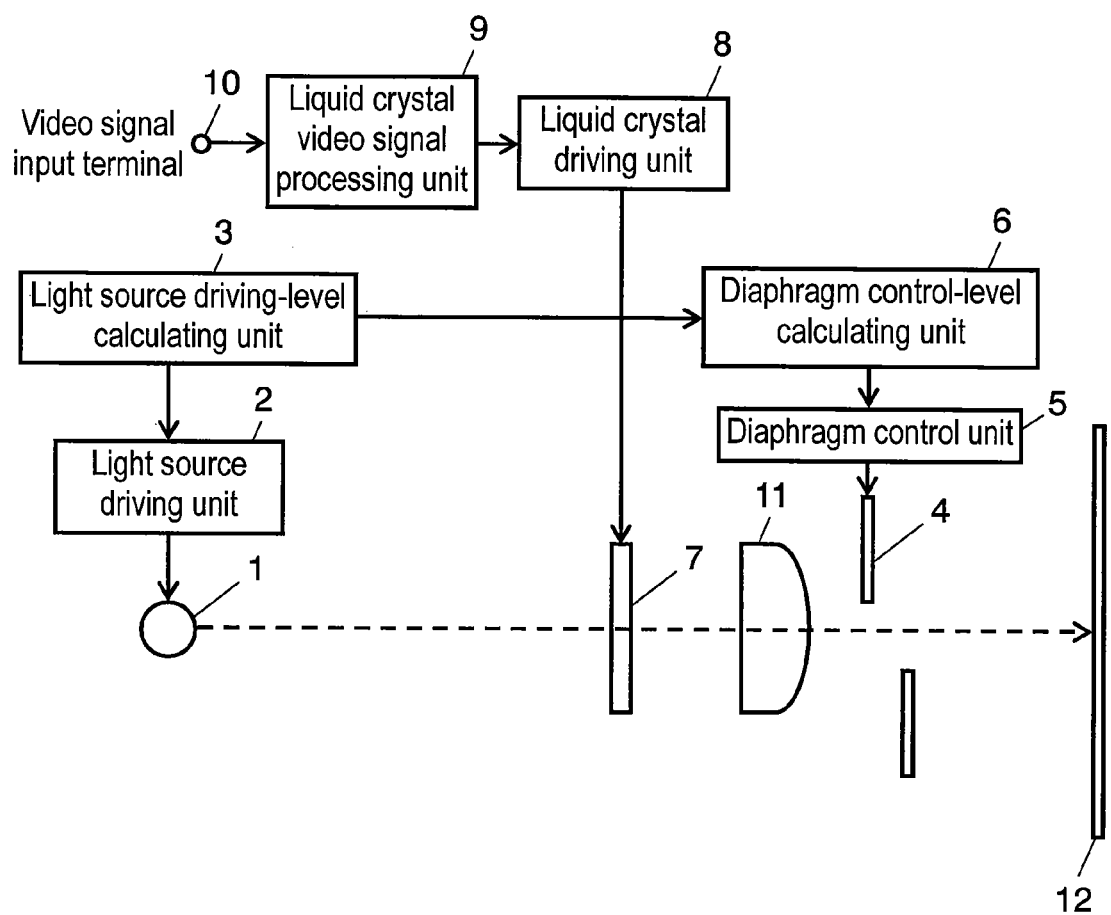
FIG. 4 is a block diagram of yet another configuration of the image display device in accordance with exemplary embodiment 1.

FIG. 3 and FIG. 4 are block diagrams of other configurations of the image display device in accordance with exemplary embodiment 1. Diaphragm 4 on the optical path is disposed between light source 1 and liquid crystal panel 7 in FIG. 2; however, the diaphragm may be disposed, for example between liquid crystal panel 7 and projection lens 11, or between projection lens 11 and screen 12, as shown in FIG. 3 or FIG. 4.

Figure 5:
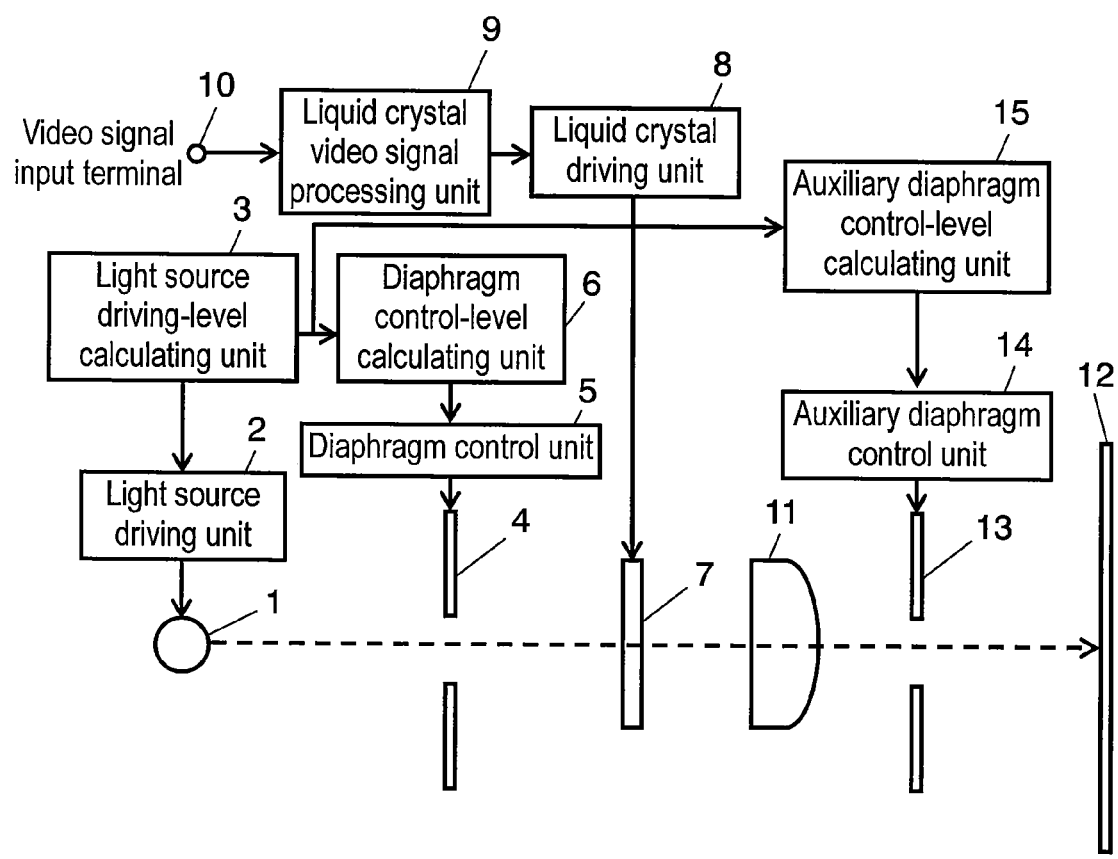
FIG. 5 is a block diagram of still another configuration of the image display device in accordance with exemplary embodiment 1.
Figure 6:
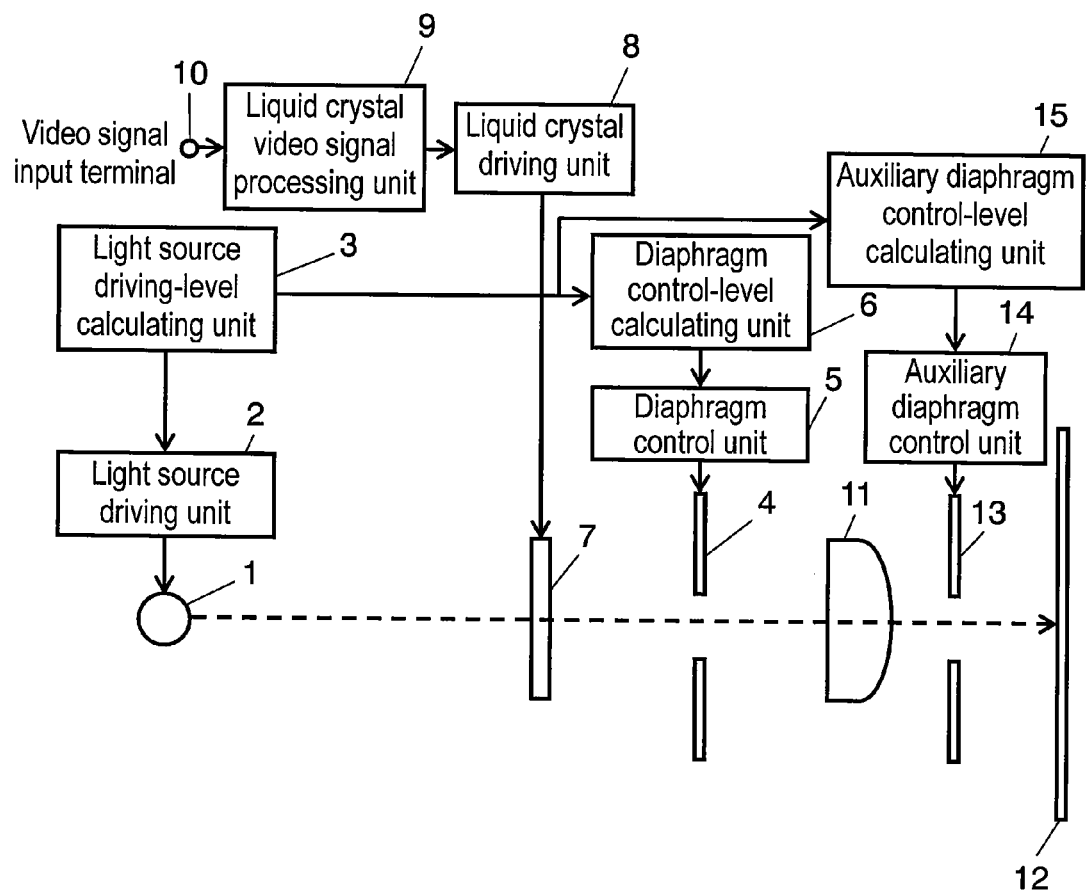
FIG. 6 is a block diagram of still another configuration of the image display device in accordance with exemplary embodiment 1.
Figure 7:
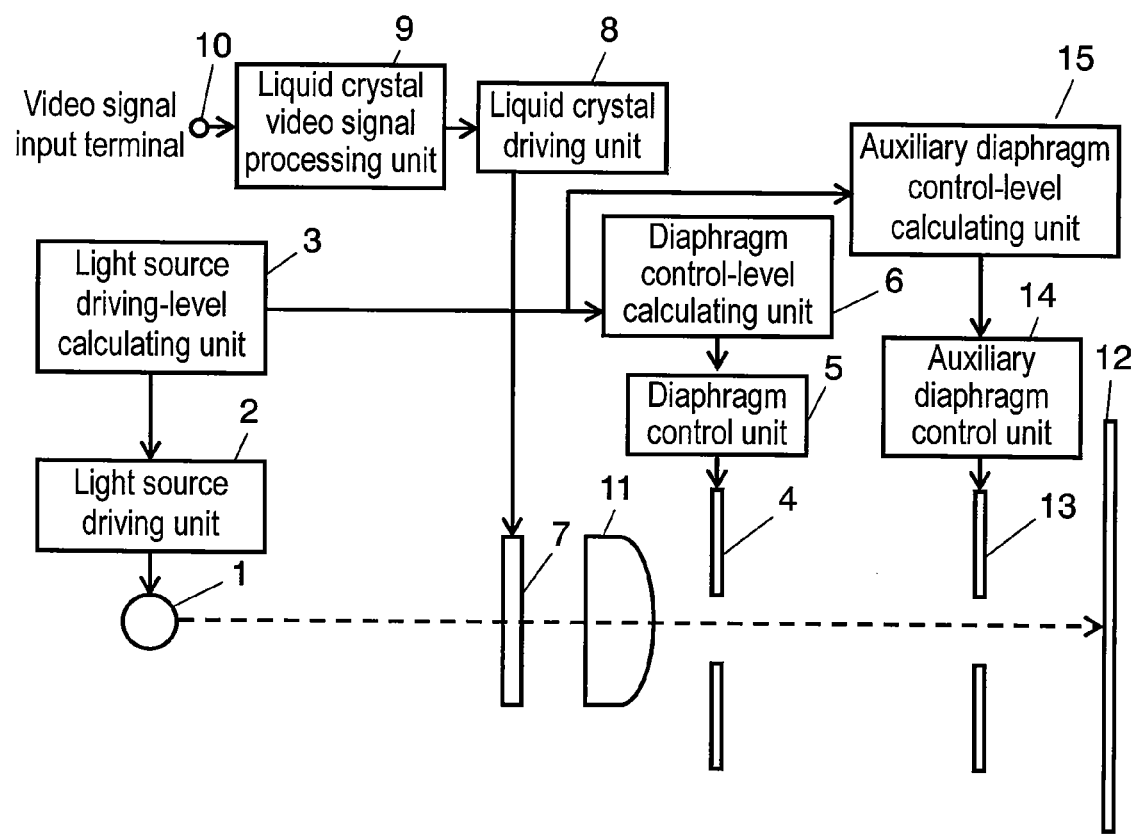
FIG. 7 is a block diagram of still another configuration of the image display device in accordance with exemplary embodiment 1.

FIG. 5 through FIG. 7 are block diagrams of other configurations of the image display device in accordance with exemplary embodiment 1. As shown in FIG. 5 through FIG. 7, auxiliary diaphragm 13, auxiliary diaphragm control unit 14, and auxiliary diaphragm control-level calculating unit 15 for assisting diaphragm 4, diaphragm control unit 5, diaphragm control-level calculating unit 6 of FIG. 1, FIG. 3, and FIG. 4 may be separately disposed, thereby controlling the quantity of light.

Adding such an auxiliary diaphragm allows fine adjustment of the quantity of light, and facilitates the adjustment of the contrast. The auxiliary diaphragm may be disposed in any position similarly to the diaphragm, or may be disposed in the projection lens.

In FIG. 3 through FIG. 7, elements similar to those in FIG. 1 are denoted with the same reference marks. Diaphragm 4 having a general diaphragm structure or blade-shaped diaphragm structure shown in FIG. 23 is used as an example for physically varying the quantity of light. However, the diaphragm is not limited to these structures when it can stably control the quantity of light emitted to the display element or the quantity of light projected to the screen as shown in FIG. 2.

Exemplary Embodiment 2

Figure 8:
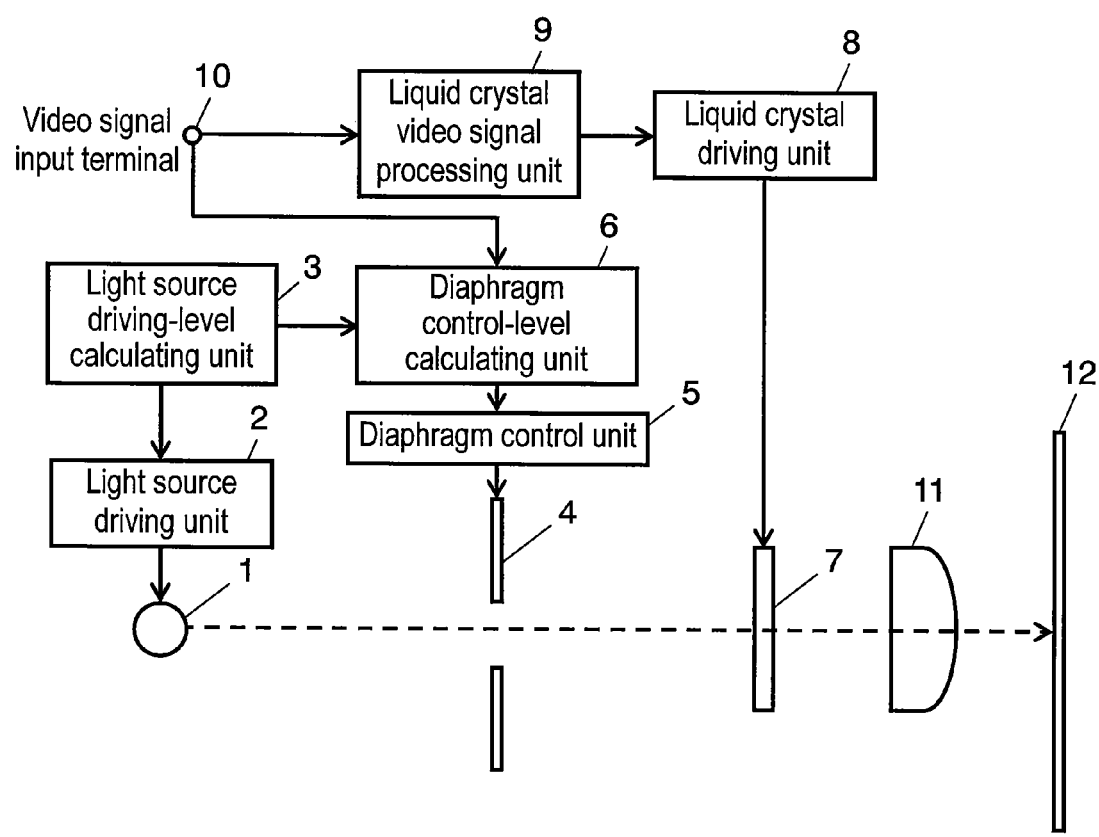
FIG. 8 is a block diagram of a configuration of an image display device in accordance with exemplary embodiment 2 of the present invention.

FIG. 8 is a block diagram of a configuration of an image display device in accordance with exemplary embodiment 2 of the present invention. In FIG. 8, elements similar to those in FIG. 1 are denoted with the same reference marks. The image display device of FIG. 8 differs from that in FIG. 1 in that a video signal from video signal input terminal 10 is fed into diaphragm control-level calculating unit 6.

Figure 9:
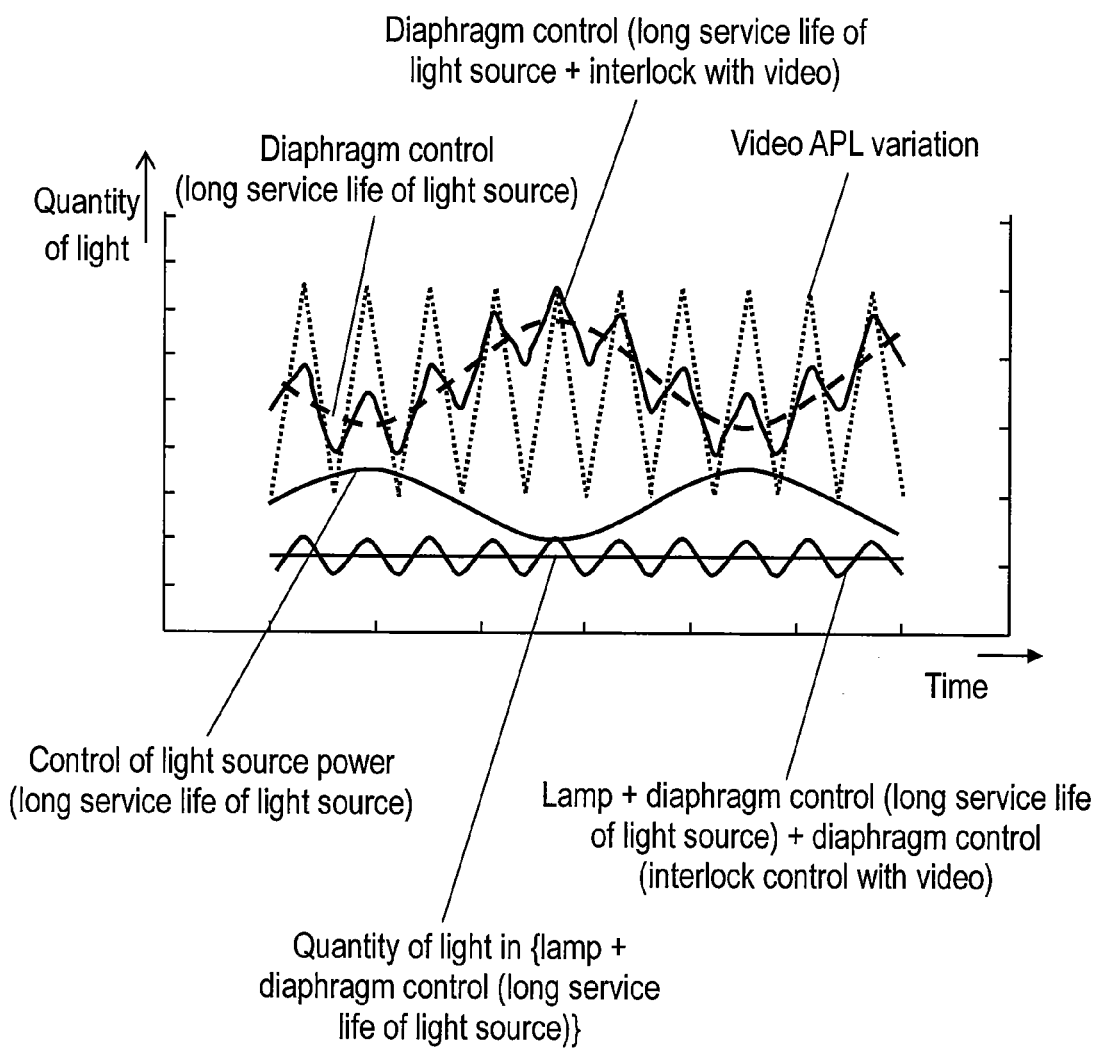
FIG. 9 illustrates an example of the light source drive and diaphragm control characteristic of the image display device in accordance with exemplary embodiment 2.

FIG. 9 illustrates an example of the light source drive and diaphragm control characteristic of the image display device in accordance with exemplary embodiment 2 of the present invention. In FIG. 9, each curve shows actual variation in quantity of light occurring when the driving power of the light source varies periodically in a sine wave shape. The broken line of the triangular wave shape shows an average picture level (APL) of the video signal fed from video signal input terminal 10. The broken line of the sine wave shape shows the diaphragm control of embodiment 1. The saw-like waveform varying in the sine wave shape shows the diaphragm control based on the video signal of embodiment 2.

This diaphragm control allows control of the quantity of light in response to the video signal, and improves the contrast feeling.

Details will be described hereinafter with reference to FIG. 10 through FIG. 13.

Figure 10:
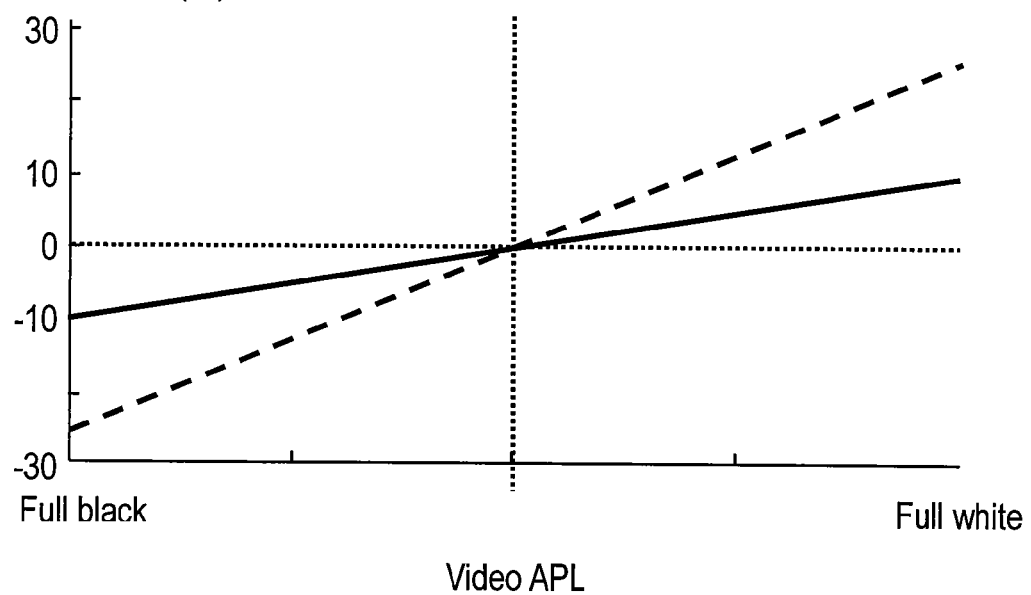
FIG. 10 illustrates an example of the video APL (average picture level) and the diaphragm control variable range interlocking with the video in the image display device in accordance with exemplary embodiment 2.

FIG. 10 illustrates an example of the video APL and the variable range of the diaphragm control interlocking with the video in the image display device in accordance with exemplary embodiment 2 of the present invention. In FIG. 10, each line shows the variable range from the aperture (hereinafter referred to as "reference aperture") used as a diaphragm reference corresponding to the video APL. The vertical axis shows value on the condition that the fully opened state corresponds to 100% and the totally closed state corresponds to 0%, similarly to FIG. 2. For example, the solid line shows that the diaphragm is further opened by 10% from the reference aperture when the whole video is white, namely the APL is high, and is further closed by 10% from the reference aperture when the whole video is black, namely the APL is low. The broken line shows that the diaphragm is further opened by 25% from the reference aperture when the whole video is white, namely the APL is high, and is further closed by 25% from the reference aperture when the whole video is black, namely the APL is low.

Figure 11:
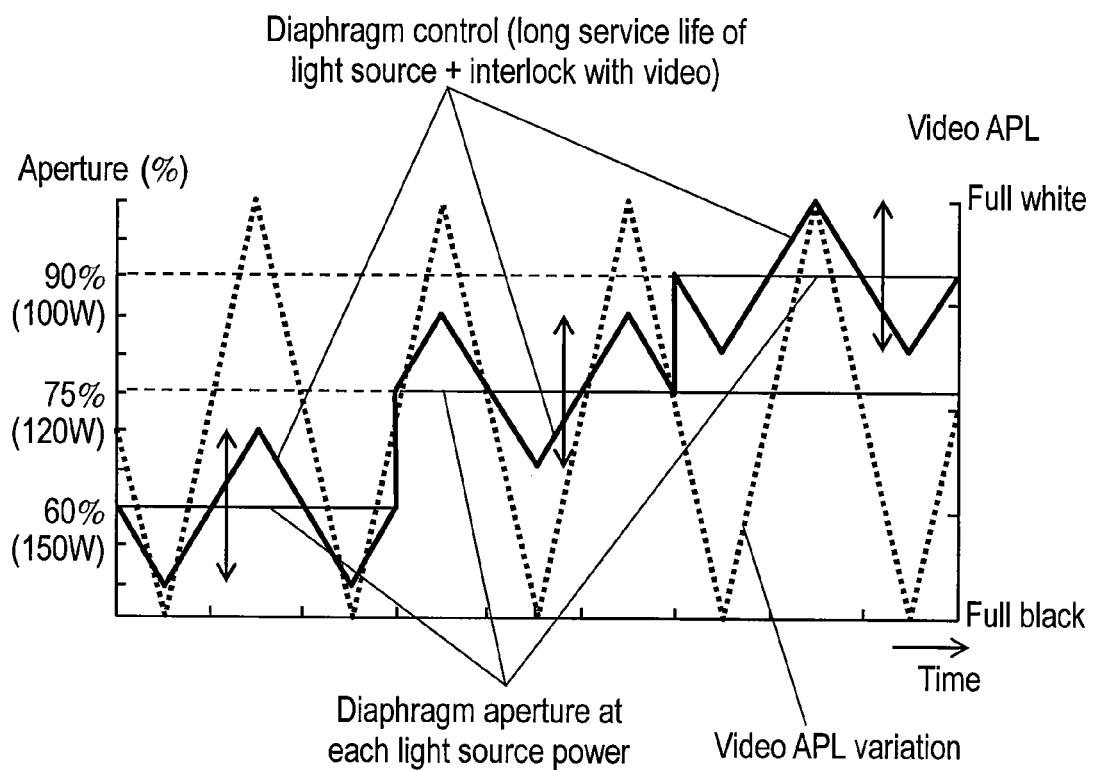
FIG. 11 illustrates a relation of the light source drive and diaphragm control to the video APL variation in the image display device in accordance with exemplary embodiment 2.

FIG. 11 illustrates a relation of the light source drive and diaphragm control to the video APL variation in the image display device in accordance with exemplary embodiment 2. FIG. 11 shows the diaphragm control performed when the video APL varies during movement of the light source with a specific driving power. The first vertical axis (left) shows the aperture of the diaphragm, and the second vertical axis (right) shows the APL of the video signal fed from the video signal input terminal. The numerical value in parentheses of the first axis shows driving power of the light source corresponding to the aperture. In FIG. 11, the broken line of the triangular wave shape shows time variation of the APL supplied from the video signal input terminal. The lines parallel with the horizontal axis show diaphragm apertures used as the reference when the driving power of the light source varies stepwise over time. The solid line of the triangular wave shape shows time variation of the diaphragm aperture corresponding to the driving power of the light source and the APL of video input.

In FIG. 11, the diaphragm aperture used as the reference is set at 90% when the light source is driven at 100 W, 75% when 120 W, and 60% when 150 W. This shows light quantity control performed by the diaphragm when the APL of the video signal varies periodically in the triangular wave shape (broken line) in a range from full white to full black. When the video is bright, namely the APL is high, the diaphragm aperture is increased (plus 10% for full white). When the video is dark, namely the APL is low, the diaphragm aperture is decreased (minus 10% for full black).

Thus, the variable range of the diaphragm interlocking with the APL of the video is set at ±10%, and the diaphragm aperture is controlled.

The improvement in contrast feeling in embodiment 2 will be described with reference to FIG. 12 and FIG. 13.

Figure 12:
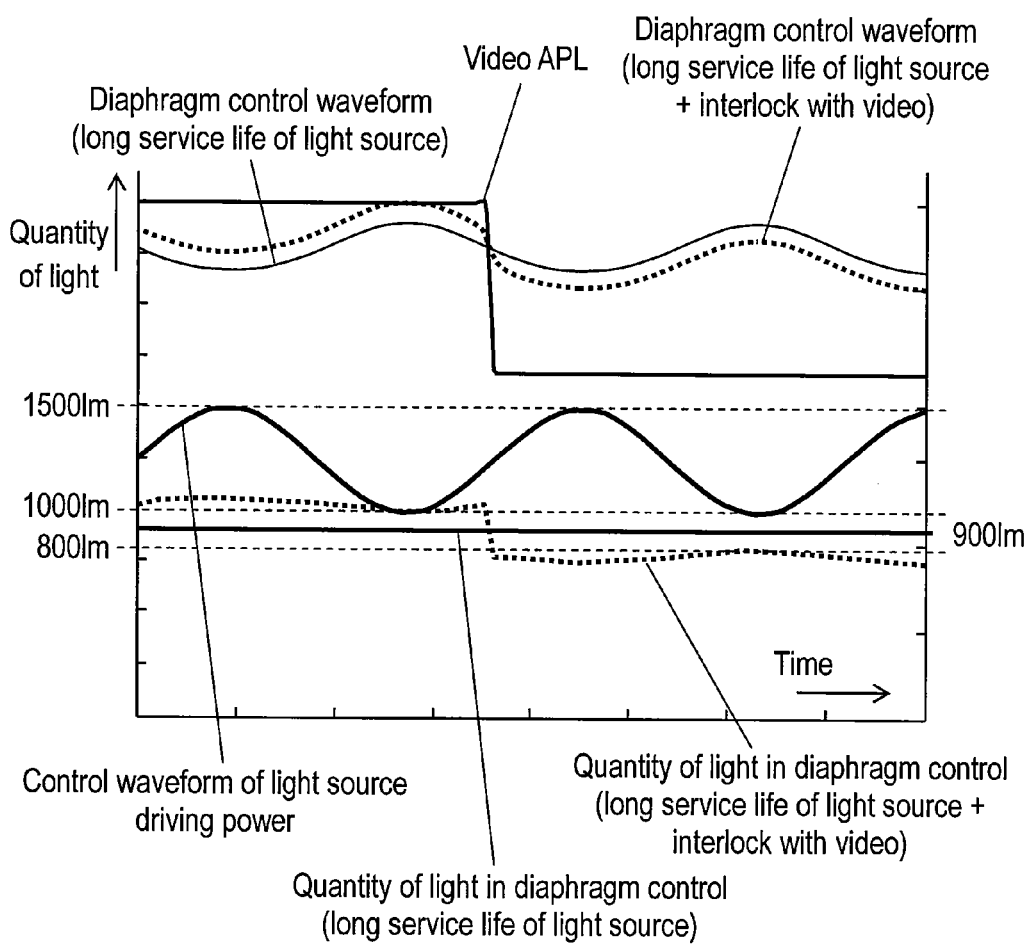
FIG. 12 illustrates an example of a relation of the diaphragm control and light quantity variation to the light source drive and video APL variation in the image display device in accordance with exemplary embodiment 2.
Figure 13:
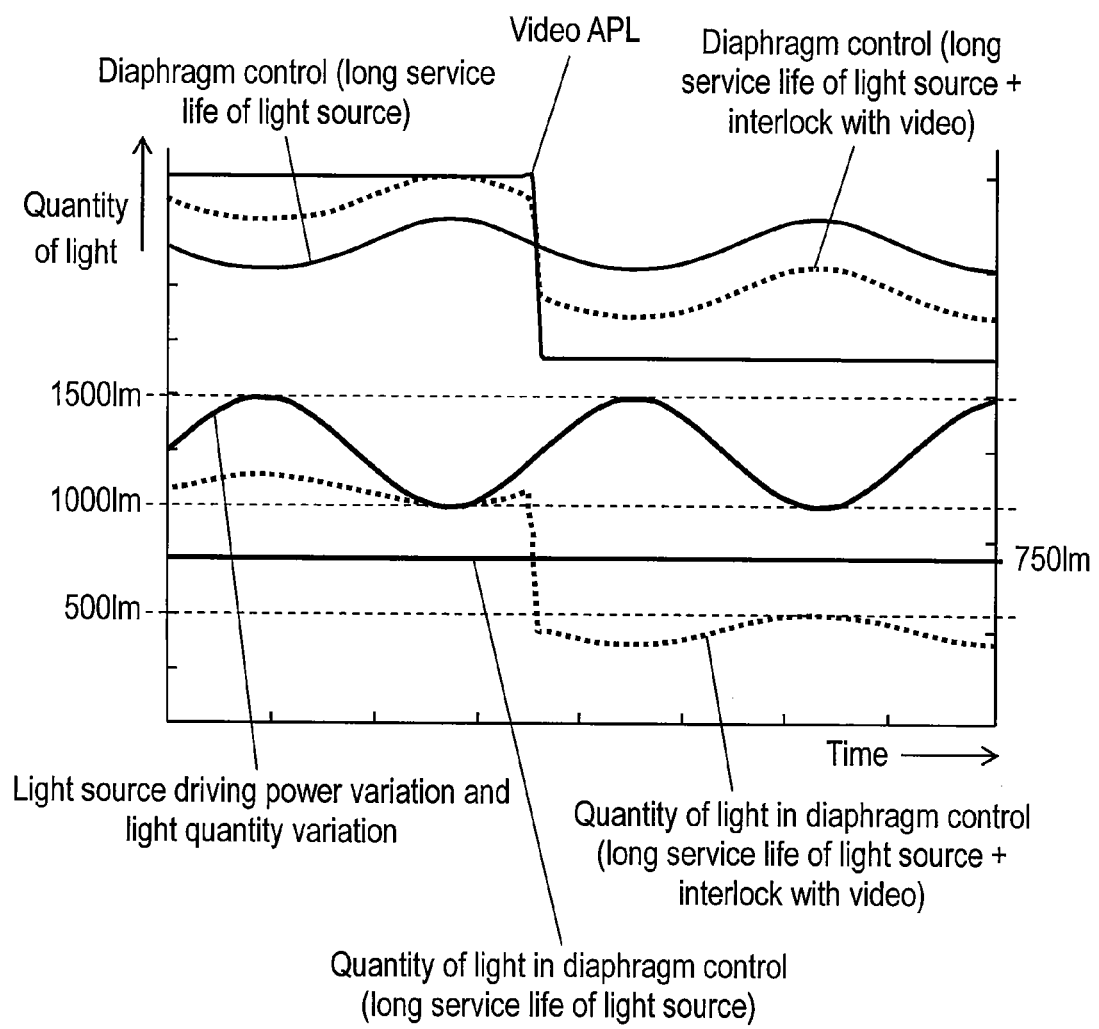
FIG. 13 illustrates another example of a relation of the diaphragm control and light quantity variation to the light source drive and video APL variation in the image display device in accordance with exemplary embodiment 2.

FIG. 12 and FIG. 13 illustrate relations of the diaphragm control and light quantity variation to the light source drive and video APL variation in the image display device in accordance with exemplary embodiment 2.

When the video APL is high or low during movement of the driving power of the light source in a sine wave shape, the diaphragm aperture and quantity of light vary as follows.

[1] In FIG. 11 and FIG. 12, a case where the quantity of light made to stay constant by the diaphragm control of long service life is 900 lm, and the variable range from the reference aperture at an interlock time with video is ±10% is described hereinafter.

At high APL,
at light source driving power of 150 W:

1500 lm×(60+10)%=1050 lm, at light source driving power of 100 W:

1000 lm×(90+10)%=1000 lm.

At low APL,
at light source driving power of 150 W:

1500 lm×(60−10)%=750 lm, at light source driving power of 100 W:

1000 m×(90−10)%=800 lm.

<At light source driving power of 150 W>

Contrast=quantity of light at high APL/quantity of light at low APL

=1050 lm/750 lm

=1.4(2.9 dB).

<At light source driving power of 100 W>

Contrast=quantity of light at high APL/quantity of light at low APL

=1000 lm/800 lm

=1.25(1.9 dB).

[2] In FIG. 13, a case where the quantity of light made to stay constant by the diaphragm control of long service life is 750 lm, and the variable range from the reference aperture at an interlock time with video is ±25% is described hereinafter.

At high APL,
at light source driving power of 150 W:

1500 lm×(50+25)%=1125 lm, at light source driving power of 100 W:

1000 lm×(75+25)%=1000 lm.

At low APL,
at light source driving power of 150 W:

1500 lm×(50−25)%=375 lm, at light source driving power of 100 W:

1000 lm×(75−25)%=500 lm.

<At light source driving power of 150 W>

Contrast=quantity of light at high APL/quantity of light at low APL

=1125 lm/375 lm

=3(9.5 dB).

<At light source driving power of 100 W>

Contrast=quantity of light at high APL/quantity of light at low APL

=1000 lm/500 lm

=2(6.0 dB).

Thus, the contrast can be improved by increasing the variable range from the reference aperture of the diaphragm control interlocking with video. The comparison of examples [1] and [2] with each other shows that the contrast is improved by 9.5−2.9=3.6 (dB) at high APL, and is improved by 6.0−1.9=4.1 (dB) at low APL.

Figure 14:
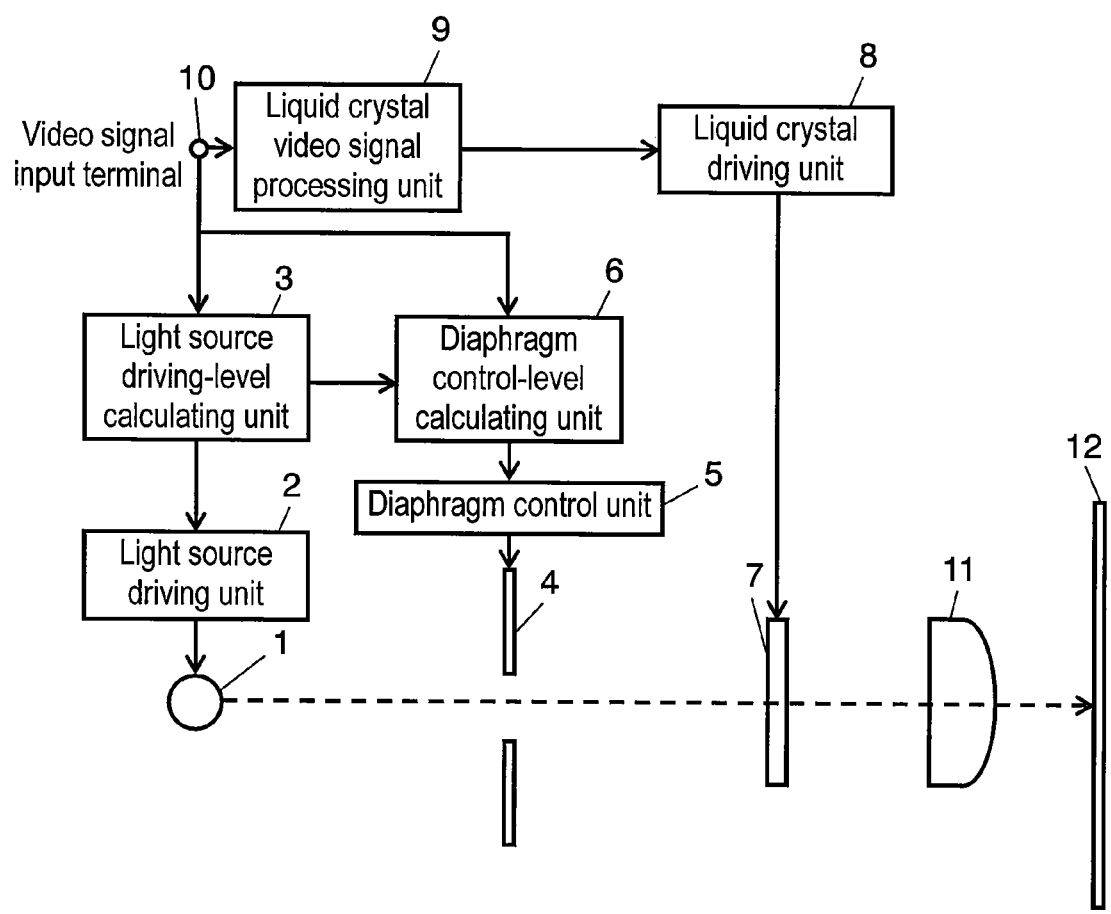
FIG. 14 is a block diagram of another example of a configuration of the image display device in accordance with exemplary embodiment 2.

Further, in FIG. 14, the driving power of the light source is also interlocked with the input from video signal input terminal 10, and the contrast feeling is improved.

FIG. 14 is a block diagram of another example of a configuration of the image display device in accordance with exemplary embodiment 2. The image display device of FIG.

14 differs from that in FIG. 8 in that a video signal from video signal input terminal 10 is fed also into light source driving-level calculating unit 3. This configuration allows the quantity of light of the light source to be controlled based on the variation of the APL of the video signal.

Figure 15:
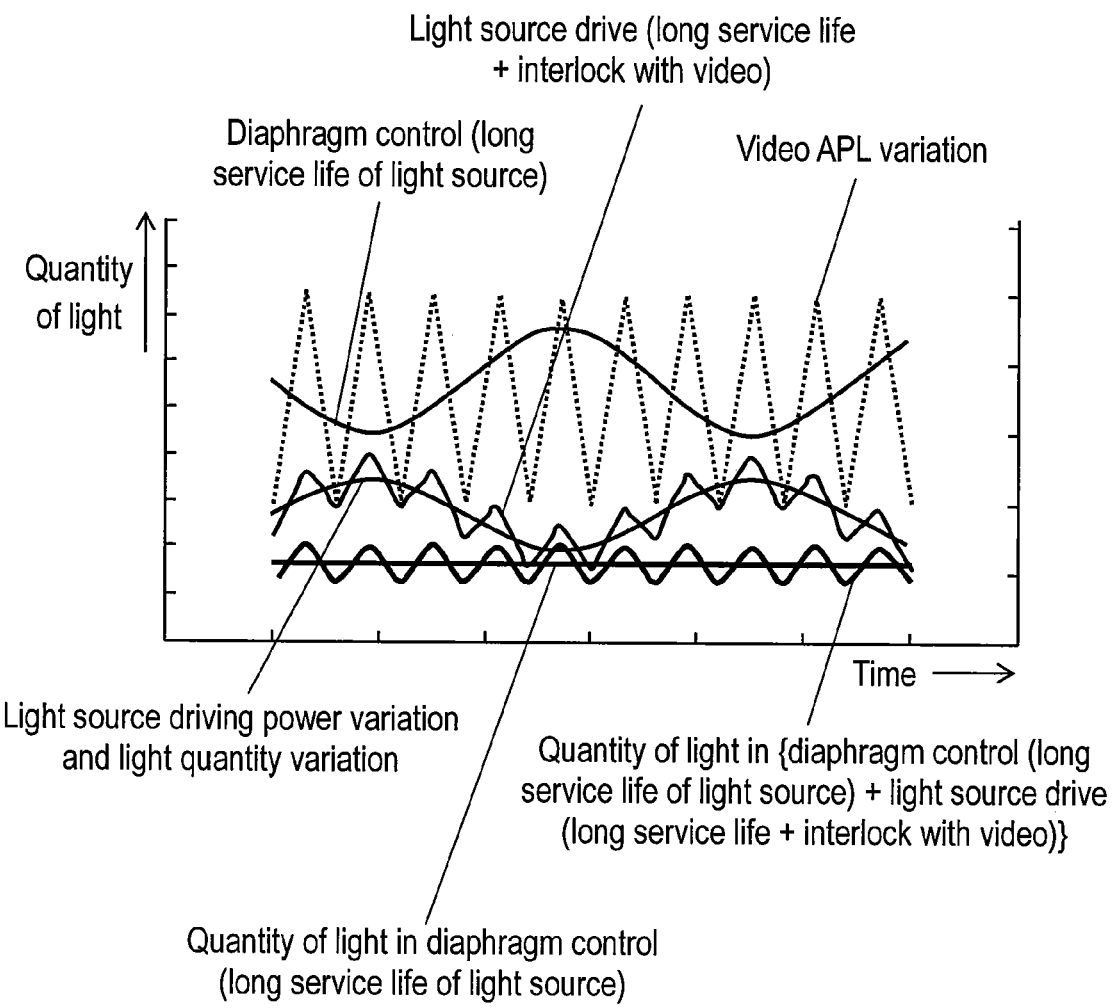
FIG. 15 illustrates another example of the light source drive characteristic and diaphragm control characteristic of the image display device in accordance with exemplary embodiment 2.
Figure 16:
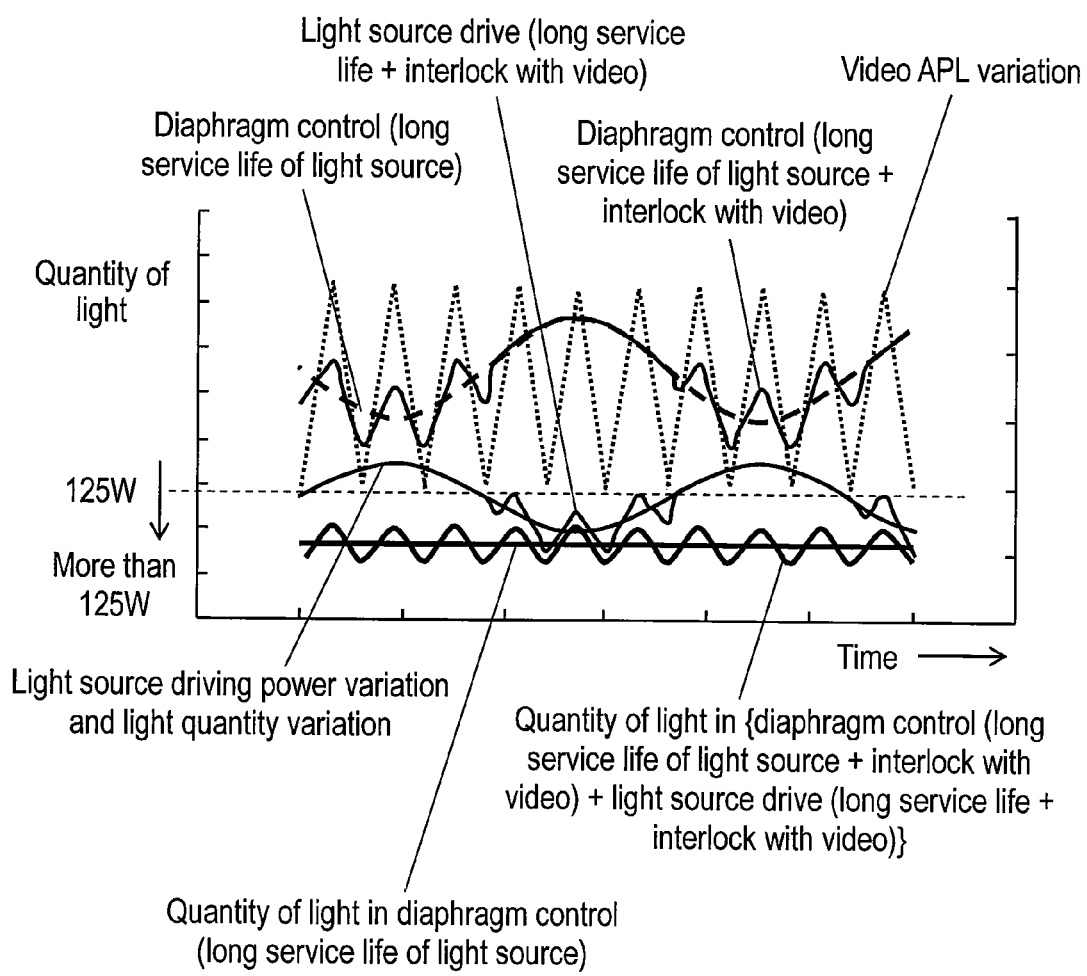
FIG. 16 illustrates yet another example of the light source drive characteristic and diaphragm control characteristic of the image display device in accordance with exemplary embodiment 2.
Figure 17:
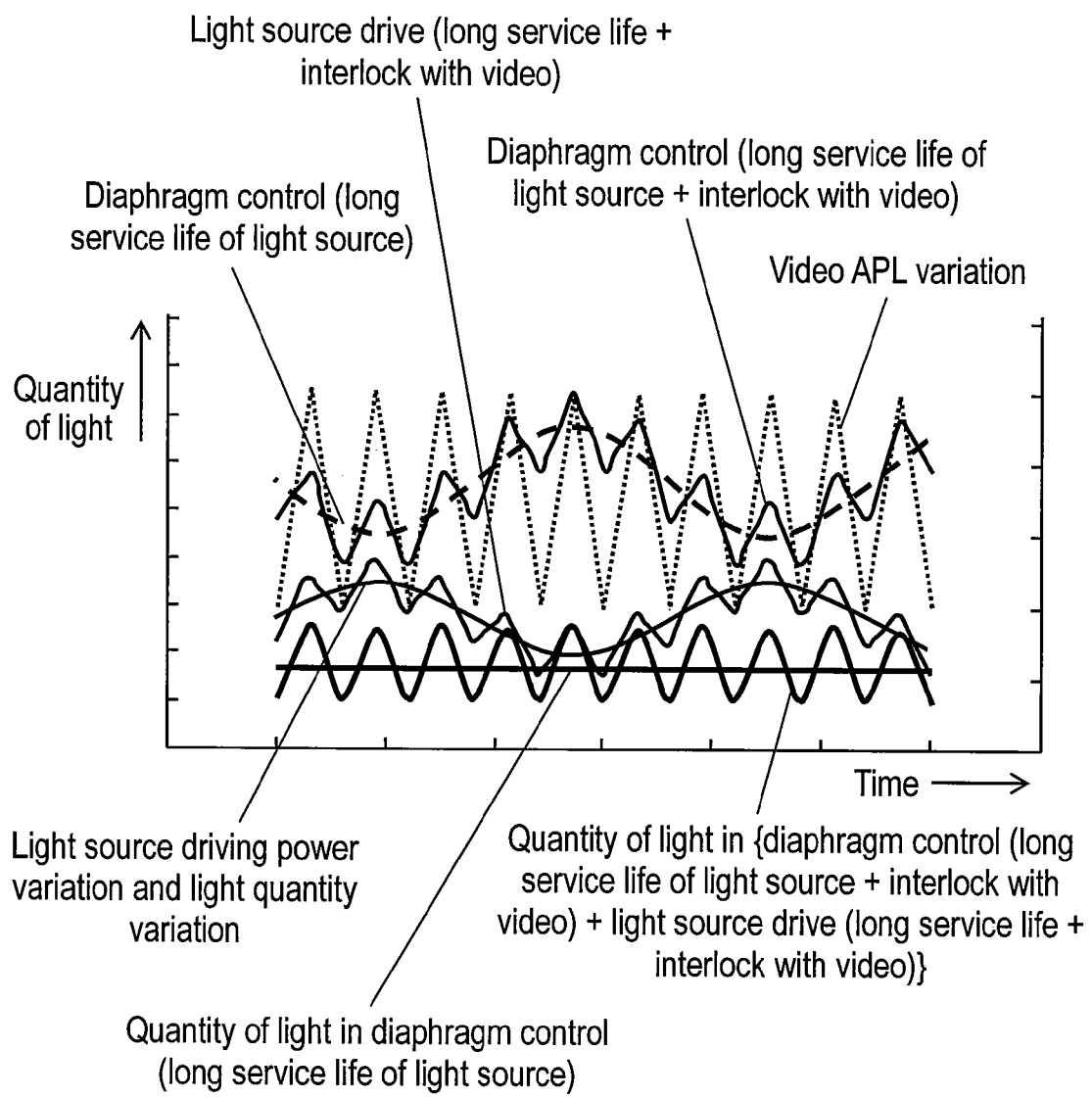
FIG. 17 illustrates still another example of the light source drive characteristic and diaphragm control characteristic of the image display device in accordance with exemplary embodiment 2.
Figure 18:
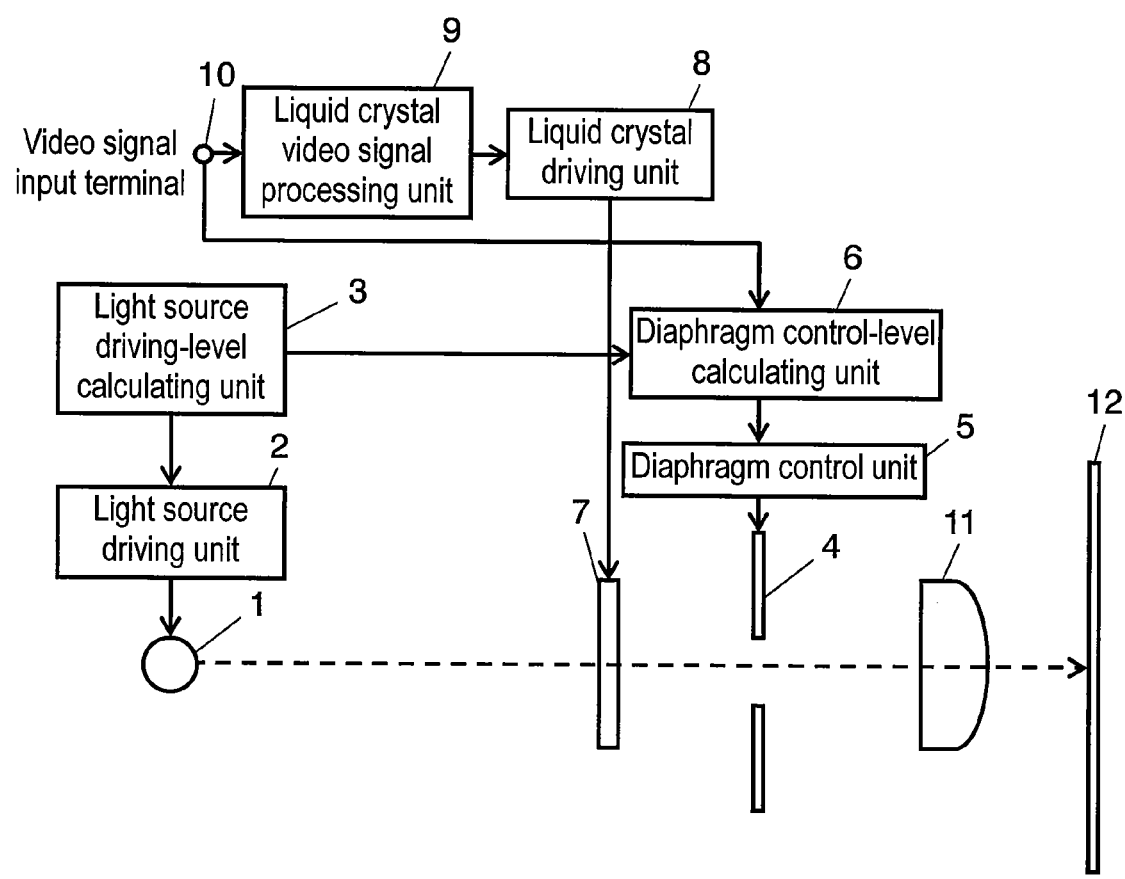
FIG. 18 is a block diagram of yet another configuration of the image display device in accordance with exemplary embodiment 2.
Figure 19:
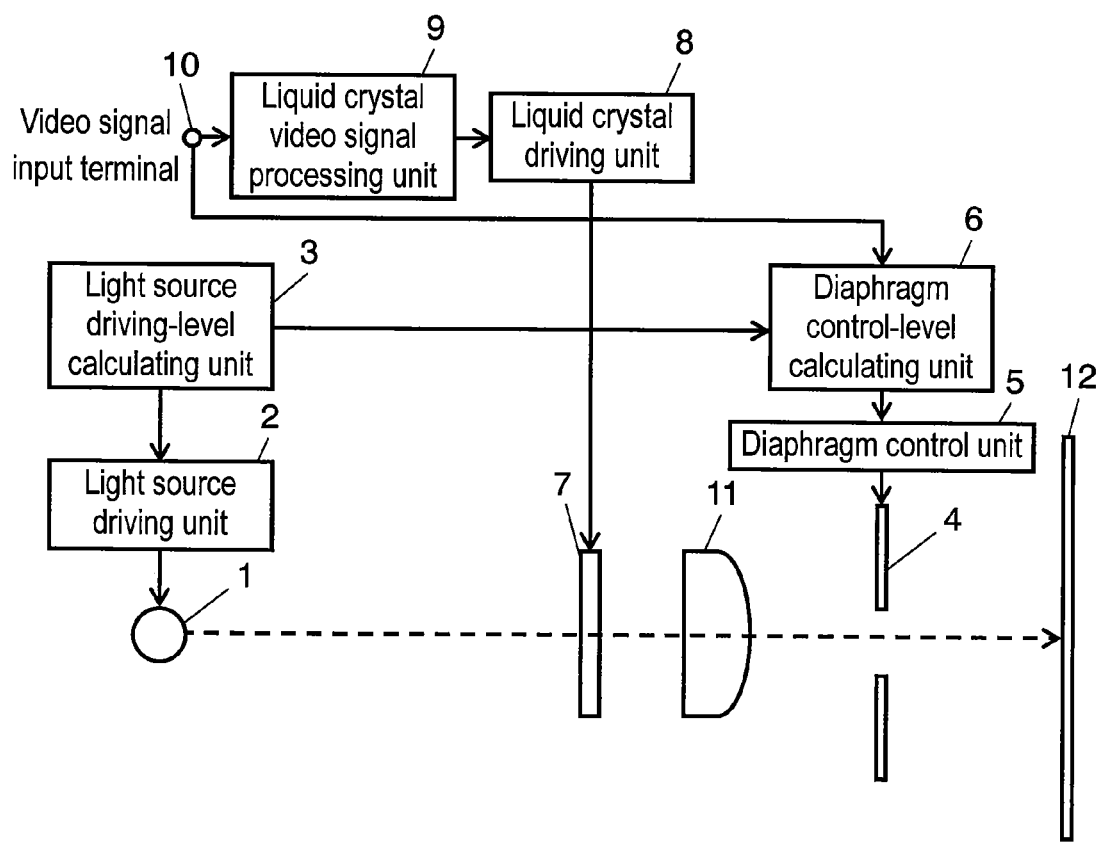
FIG. 19 is a block diagram of still another configuration of the image display device in accordance with exemplary embodiment 2.
Figure 20:
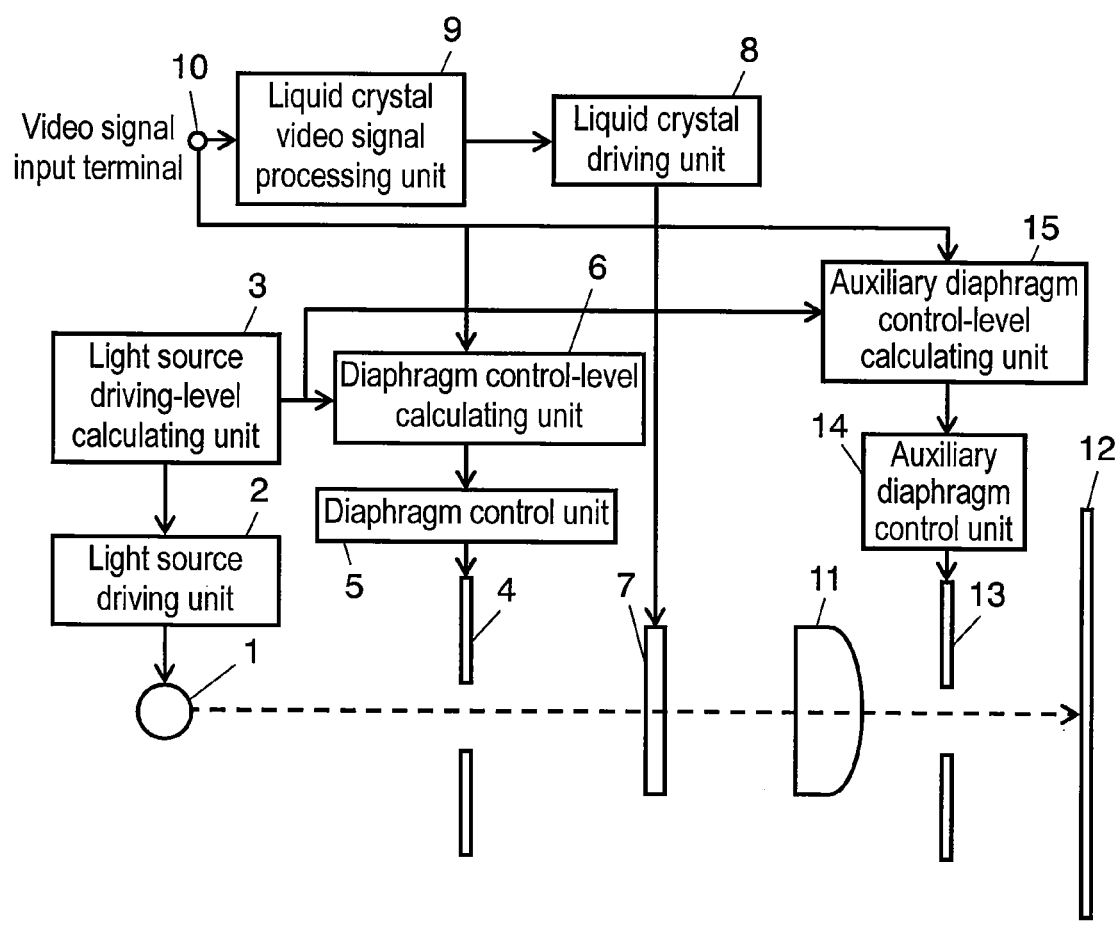
FIG. 20 is a block diagram of still another configuration of the image display device in accordance with exemplary embodiment 2.
Figure 21:
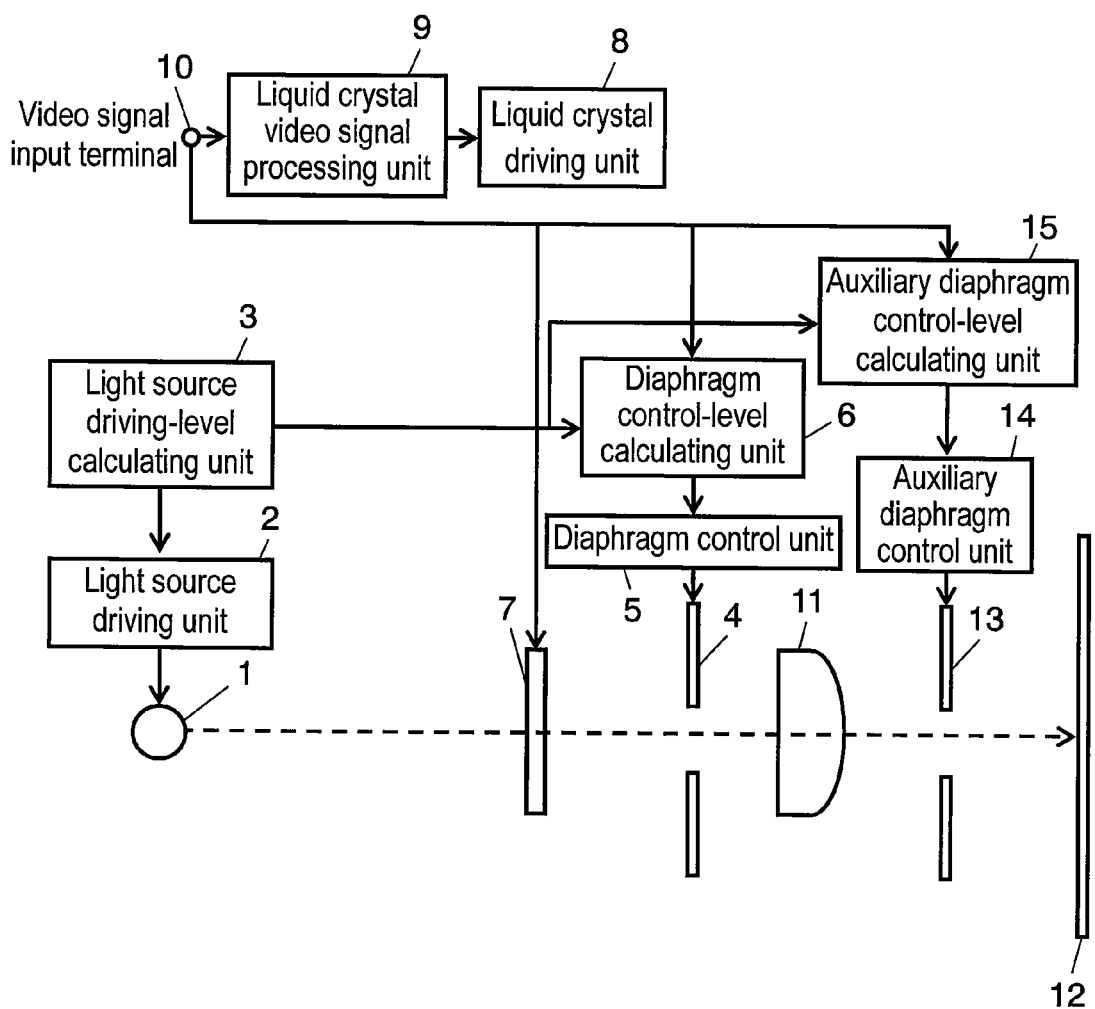
FIG. 21 is a block diagram of still another configuration of the image display device in accordance with exemplary embodiment 2.
Figure 22:
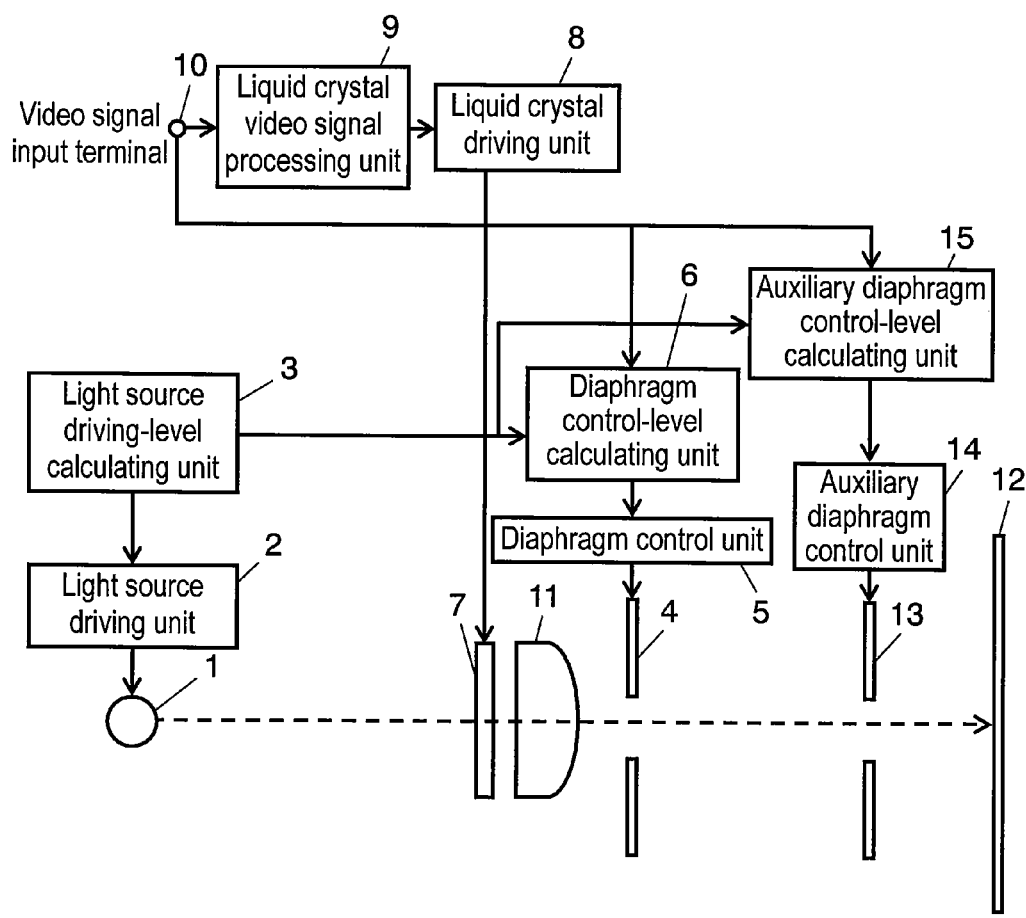
FIG. 22 is a block diagram of still another configuration of the image display device in accordance with exemplary embodiment 2.

FIG. 15 through FIG. 17 illustrate other examples of the light source drive characteristic and diaphragm control characteristic of the image display device in accordance with exemplary embodiment 2. FIG. 15 through FIG. 17 are similar to FIG. 9.

In FIG. 15, in driving control of the light source shown in embodiment 1, the driving power of the light source interlocks with the input from video signal input terminal 10. Essentially, the light source driving power moves in a sine wave shape. Additionally, the variable range of the driving power is controlled so as to further increase the light source driving power when the APL is high and further decrease the light source driving power when the APL is low. At this time, the diaphragm is controlled to cancel a basic variation of the sine wave shape of the light source drive, similarly to embodiment 1.

Essentially, the service life of the light source is increased by these controls, and the brightness is varied by control of the light source driving power responsive to the video signal input, thereby improving the contrast feeling.

Actually, when absolute rating voltage or the like of the light source is considered, or when the variable range of the quantity of light supplied to screen 12 cannot be obtained sufficiently at high voltage, the contrast is improved by controlling the diaphragm in interlock with the video.

In FIG. 16, as an example, the interlock with the video is considered only by controlling the diaphragm when the light source driving power used as reference is 125 W or higher, or only by controlling the driving power of the light source when the reference light source driving power is lower than 125 W. In this case, also, the contrast feeling is improved similarly to FIG. 15.

[3] In FIG. 17, the variable range of the quantity of light supplied to screen 12 is secured by interlocking the light source and diaphragm with the video. When the numerical values of FIG. 13 are used as a specific example, and the variable range of the driving power of the light source is set at ±10 W, the following result is obtained by calculation.

At high APL,
at light source driving power of (150+10) W:

1600 lm×(50+25)%=1200 lm, at light source driving power of (100+10) W:

1100 lm×(75+25)%=1100 lm.

At low APL,
at light source driving power of (150−10) W:

1400 lm×(50−25)%=350 lm, at light source driving power of (100−10) W:

900 lm×(75−25)%=450 lm.

<At light source driving power of 150 W reference>

Contrast=quantity of light at high APL/quantity of light at low APL

=1200 lm/350 lm

=3.43(10.7 dB).

<At light source driving power of 100 W reference>

Contrast=quantity of light at high APL/quantity of light at low APL

=1100 lm/450 lm

=2.44(7.8 dB).

Since the variable range of the quantity of light supplied to screen 12 is secured by interlocking not only the diaphragm but also the light source with the video, the contrast feeling can be further improved. The comparison of examples [2] and [3] with each other shows that the contrast is improved by 10.7−9.5=1.2 (dB) at high APL, and is improved by 7.8−6.0=1.8 (dB) at low APL.

In embodiment 2, the fluctuation of the projected image by the driving method is cancelled for increasing the service life of the light source, and light quantity control considering the brightness variation of the video signal can be performed. Therefore, advantageously, the service lives of the optical components including the light source are increased, and the contrast feeling is improved.

The above-mentioned numerical values and driving method are only one example, and may be set based on the performance of the components such as a light source, an optical system, and a display element, and the index considering the video signal.

The time variation of the APL from the video input terminal is assumed to be in a triangular wave shape for simplicity in FIG. 9, but the actual input video varies on a random basis. The diaphragm is preferably controlled so as to have an aperture corresponding to the light source driving power and the APL of the video signal at a certain point.

The variable range from the reference aperture of the diaphragm corresponding to the video APL is varied linearly from full black to full white for simplicity in FIG. 10. However, when the variable range is varied in an exponential curve, the degree of light quantity variation at high APL is increased. When the variable range is varied in a logarithmic curve, the degree of the light quantity variation at low APL is increased. An intermediate APL value is used as the reference aperture, but the higher APL or lower APL may be used. Thus, the control method may be arbitrarily set in response to a target or application.

The improvement in contrast feeling based on the APL has been used as an index of the information of the video signal, for example. However, this is simply one example. Information to be used may be a histogram of the brightness distribution on the screen, for example. The index as a target is not limited to the improvement in contrast feeling, but may be arbitrarily set in response to a target image quality.

The diaphragm control range interlocking with the video in the present embodiment is set constant regardless of the light source power; however, the control range may be a variable range capable of utilizing the diaphragm dynamic range at a maximum in response to the light source driving power at that time.

The diaphragm aperture corresponding to the light source driving power is used as reference in the present embodiment. However, when the width of the light quantity variation of the light source is narrow, the diaphragm may be controlled with reference to the index obtained from the video signal, and the driving power variation of the light source may be added to it.

FIG. 18 through FIG. 22 are block diagrams of other configurations of the image display device in accordance with exemplary embodiment 2 of the present invention. In addition to the diagram arrangement of FIG. 8, the diagram arrangements of FIG. 18 through FIG. 22 may be employed.

INDUSTRIAL APPLICABILITY

An image display device of the present invention spatially modulates a display element having an optical modulating function of light of the light source and displays an image. This image display device is useful in a field where the service life of the light source increases, stable brightness control of the light source that has no brightness fluctuation of the light source is allowed, and the contrast feeling can be improved.

The invention claimed is:

1. An image display device comprising:
a light source;
a light source driving unit for controlling a driving power of the light source;
a light source driving-level calculating unit for calculating a driving level of the light source and outputting the driving level of the light source to the light source driving unit, the light source driving-level calculating unit providing a variable driving power in a certain period of time;
a diaphragm for adjusting a quantity of light of the light source;
a diaphragm control unit for controlling a narrowing amount of the diaphragm;
a diaphragm control-level calculating unit for outputting the narrowing amount to the diaphragm control unit responsive to the variable driving power supplied from the light source driving-level calculating unit;
a liquid crystal panel for modulating light of the light source;
a liquid crystal driving unit for driving the liquid crystal panel;
a liquid crystal video signal processing unit for converting an input video signal into a signal for driving the liquid crystal panel; and
a projection lens for expanding and projecting an image of the liquid crystal panel,
wherein the light source driving-level calculating unit generates a repeatedly varying fluctuation in the driving power corresponding to the variable driving power in the certain period, and
the diaphragm control-level calculating unit controls the diaphragm so as to cancel brightness fluctuation of the light source corresponding to the fluctuation of the driving power and wherein either only the diaphragm is interlocked with the input video signal when the driving power of the light source is a predetermined power or more, or only the driving power of the light source is interlocked with the input video signal when the driving power of the light source is smaller than the predetermined power.

2. The image display device of claim 1,
wherein the light source, the diaphragm, the liquid crystal panel, and the projection lens are disposed in that order along an optical path.

3. The image display device of claim 1 further comprising:
an auxiliary diaphragm for adjusting the quantity of light of the light source;
an auxiliary diaphragm control unit for controlling a narrowing amount of the auxiliary diaphragm; and
an auxiliary diaphragm control-level calculating unit for outputting the narrowing amount to the diaphragm control unit based on a signal from the light source driving-level calculating unit.

4. The image display device of claim 3,
wherein the light source, the diaphragm, the liquid crystal panel, the projection lens, and the auxiliary diaphragm are disposed in that order along an optical path.

5. The image display device of claim 1,
wherein the diaphragm control-level calculating unit outputs the narrowing amount based on the input video signal.

6. The image display device of claim 5,
wherein the light source, the diaphragm, the liquid crystal panel, and the projection lens are disposed in that order along an optical path.

7. The image display device of claim 5 further comprising:
an auxiliary diaphragm;
an auxiliary diaphragm control unit; and
an auxiliary diaphragm control-level calculating unit.

8. The image display device of claim 7,
wherein the light source, the diaphragm, the liquid crystal panel, the projection lens, and the auxiliary diaphragm are disposed in that order along an optical path.

9. The image display device of claim 5,
wherein aperture of the diaphragm is increased when APL of the input video signal is high, and the aperture of the diaphragm is decreased when the APL is low.

10. The image display device of claim 9,
wherein a movable range of the diaphragm responsive to the APL of the input video signal is varied linearly from full black to full white.

11. The image display device of claim 9,
wherein a movable range of the diaphragm responsive to the APL of the input video signal is varied in an exponential curve from full black to full white.

12. The image display device of claim 9,
wherein a movable range of the diaphragm responsive to the APL of the input video signal is varied in a logarithmic curve from full black to full white.

13. The image display device of claim 5,
wherein an aperture of the diaphragm is varied based on information of a histogram of brightness distribution of the input video signal on a screen.

14. The image display device of claim 5,
wherein a control range of the diaphragm interlocking with the input video signal is varied by the driving power of the light source.

15. The image display device of claim 5,
wherein variation of the driving power of the light source is incorporated into control of the diaphragm interlocking with the input video signal.

* * * * *